US 8,059,831 B2
(12) United States Patent
Tong et al.

(10) Patent No.: US 8,059,831 B2
(45) Date of Patent: Nov. 15, 2011

(54) NOISE PROCESSING DEVICE AND METHOD THEREOF

(75) Inventors: Shiu-Rong Tong, Kaohsiung (TW); Tsung-Li Yeh, Siyu Township, Penghu County (TW); Yu-Pin Chou, Tongsiao Township, Miaoli County (TW); Tzuo-Bo Lin, Taipei (TW)

(73) Assignee: RealTek Semiconductor Corp., Hsinchu (TW)

( * ) Notice: Subject to any disclaimer, the term of this patent is extended or adjusted under 35 U.S.C. 154(b) by 1227 days.

(21) Appl. No.: 11/436,574

(22) Filed: May 19, 2006

(65) Prior Publication Data
US 2006/0263064 A1    Nov. 23, 2006

(30) Foreign Application Priority Data
May 19, 2005 (TW) ............................... 94116270 A

(51) Int. Cl.
*H04B 15/00* (2006.01)
(52) U.S. Cl. ....................................... 381/94.5; 381/94.1
(58) Field of Classification Search ........ 381/94.1–94.8, 381/66, 56, 104–107, 61; 700/94; 704/226, 704/233, E17.014, E21.002, E21.004, E15.039
See application file for complete search history.

(56) References Cited

U.S. PATENT DOCUMENTS
6,088,668 A * 7/2000 Zack .............................. 704/225
7,024,004 B2 * 4/2006 Nishiyama .................... 381/94.5
7,130,433 B1 * 10/2006 Suzuki .......................... 381/94.8
* cited by examiner

*Primary Examiner* — Devona Faulk
*Assistant Examiner* — Disler Paul
(74) *Attorney, Agent, or Firm* — Thomas, Kayden, Horstemeyer & Risley, LLP

(57) ABSTRACT

A noise processing device and its method are provided for a video/audio system having a high definition multimedia interface (HDMI). The noise processing device includes a detecting unit, a signal generating unit, and a decision unit. The noise processing method includes using the detecting unit to monitor a variation related to an audio signal and generate a detecting signal accordingly; using the signal generating unit to produce an adjustment signal according to the detecting signal; and using the decision unit to produce an output audio signal according to the audio signal and the adjustment signal. Another embodiment of the noise processing device includes a compensation tracking unit having a control unit. The compensation tracking unit produces an output audio signal according to a difference between the output audio signal itself and the audio signal and a gain of the control unit.

12 Claims, 4 Drawing Sheets

NOISE PROCESSING DEVICE AND METHOD THEREOF

BACKGROUND OF THE INVENTION

1. Field of the Invention

The present invention is related to a device for reducing noise of audio signals and a method for the same, and more particularly, to a device that is used to reduce the noise of audio signals of a digital video/audio system and its method.

2. Description of Related Art

With the rapid progress of multimedia technologies, a high definition multimedia interface (HDMI) was developed and introduced into the market. The high definition multimedia interface is a digital video/audio interface. In the high definition multimedia interface, packets for conveying audio data are first processed by an audio processing unit and then the audio data are outputted by a playback unit. For example, when a transmitting device having the high definition multimedia interface, such as an optical disk playback device, transmits digital audio packets to a receiving device, such as a digital television, the audio processing unit of the receiving device is used to process the data of the digital audio packets and then the audio data is outputted by the playback unit. However, in some circumstances, for example, the system being turned on or off, a mute mode being entered or left, or audio signals being transmitted to the receiving device at the first time after a period of pause, the receiving device might receive audio signals that change rapidly and thus an unpleasant noise is produced.

Accordingly, as discussed above, the prior art still has some drawbacks that could be improved. The present invention aims to resolve the drawbacks in the prior art.

SUMMARY OF THE INVENTION

An objective of the present invention is to provide a noise processing device and its method to resolve the problems mentioned above.

Another objective of the present invention is to provide a noise processing device and its method to process an audio signal that has a discontinuous waveform and is sent from a video/audio system having a high definition multimedia interface (HDMI) to reduce the audio noise of the video/audio system.

Still another objective of the present invention is to provide a noise processing device and its method to reduce the noise existed in an audio signal sent from a video/audio system having a high definition multimedia interface (HDMI). Thus, the audio quality of the video/audio system having the high definition multimedia interface is improved.

In accordance with an embodiment of the present invention, a noise processing device and its method is provided. The noise processing device and the method thereof are applied for a video/audio system having a high definition multimedia interface. The noise processing device includes a detecting unit, a signal generating unit, and a decision unit. The noise processing method includes using the detecting unit to monitor a variation related to an audio signal to generate a detecting signal correspondingly; using the signal generating unit to produce an adjustment signal according to the detecting signal; and using the decision unit to produce an output audio signal according to the audio signal and the adjustment signal. Therein the adjustment signal is for reducing the effect caused by the variation related to the audio signal.

In accordance with another embodiment of the present invention, a noise processing device and its method is provided. The noise processing device and the method thereof are also applied for a video/audio system having a high definition multimedia interface. The noise processing device includes a compensation tracking unit. The compensation tracking unit further has a control unit. The noise processing method includes using the compensation tracking unit to produce an output audio signal according to an audio signal. Therein the compensation tracking unit produces the output audio signal according to a difference between the output audio signal and the audio signal and a gain of the control unit.

Numerous additional features, benefits and details of the present invention are described in the detailed description, which follows.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF PREFERRED EMBODIMENTS

Figure 1:
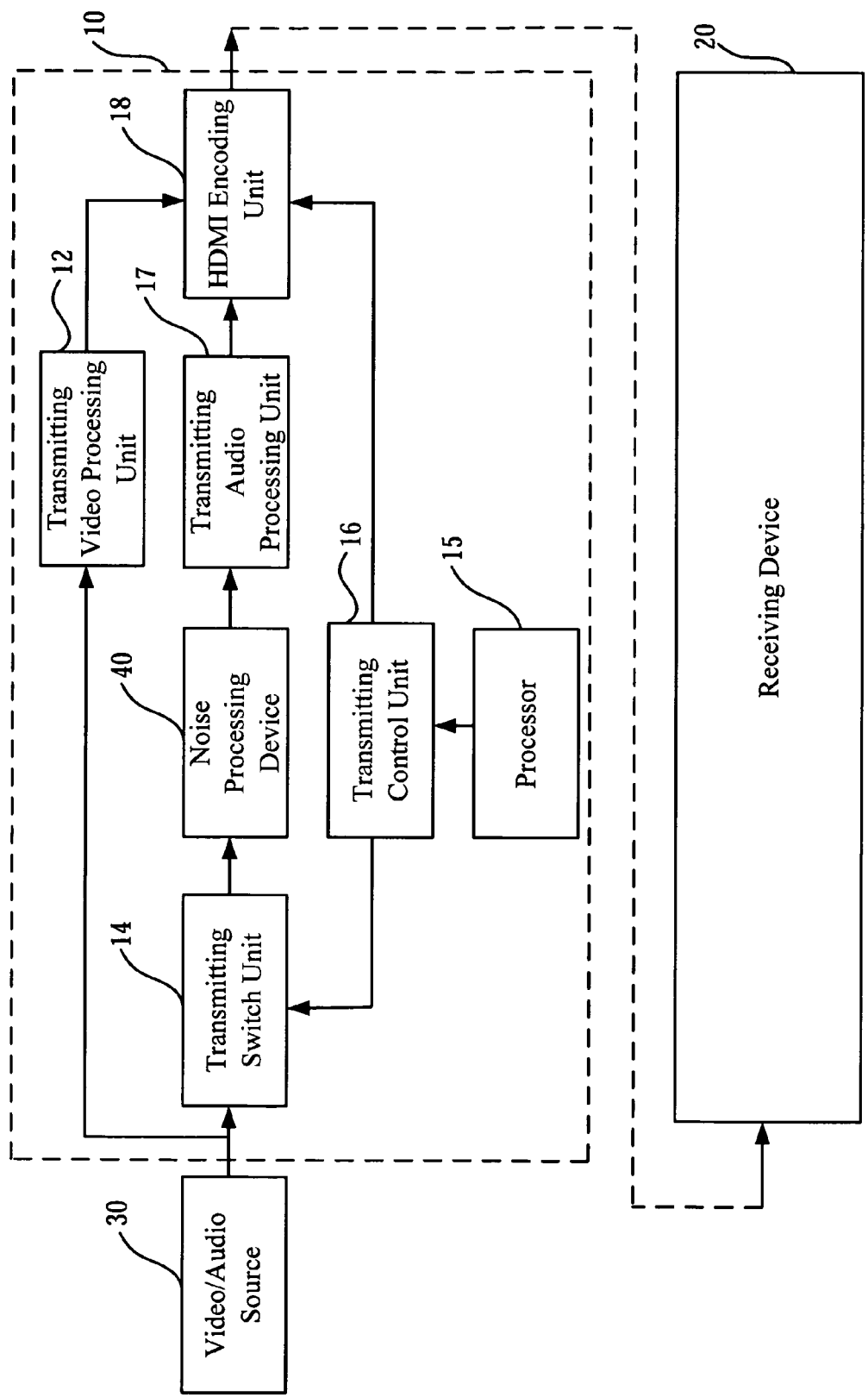
FIG. 1 is a block diagram of a digital video/audio system having a noise processing device in accordance with a preferred embodiment of the present invention.

Reference is made to FIG. 1, which is a block diagram of a digital video/audio system having a noise processing device in accordance with a preferred embodiment of the present invention. As shown in FIG. 1, the video/audio system includes a transmitting device 10 and a receiving device 20. The transmitting device 10 can be an optical disk playback device. It is used to transmit digital video/audio signals. The receiving device 20 can be a digital television and is used to receive the digital video/audio signals sent from the transmitting device 10. The transmitting device 10 and the receiving device 20 can be other digital video/audio transmitting and receiving devices. For example, the transmitting device 10 can be a video playback device with a built-in hard disk while the receiving device 20 can be a digital projector. Since the substitutions the transmitting and receiving devices are well known in the prior art, they are not described in detail here.

As described above, the transmitting device 10 accesses video/audio data from a video/audio source 30 and delivers the video/audio data to a transmitting video processing unit 12 and a transmitting switch unit 14 respectively. The transmitting video processing unit 12 transmits transmission video signals according to the video data of the video/audio source 30. A processor 15 of the transmitting device 10 sends a control signal to a transmitting control unit 16 according to a command received by the video/audio system or an operative state of the video/audio system. The transmitting control unit 16 sends a switch signal to the transmitting switch unit 14 according to the control signal and thus controls the operation of the transmitting switch unit 14. The transmitting switch unit 14 is coupled to a noise processing device 40 of the present invention. When the transmitting switch unit 14 is switched to an output state, the transmitting switch unit 14 sends audio signals to the noise processing device 40 according to the audio data obtained from the video/audio source 30. After receiving the audio signals, the noise processing device 40 processed them and then generates output audio signals.

As shown in FIG. 1, the transmitting device 10 has a transmitting audio processing unit 17. After receiving the output audio signals, the transmitting audio processing unit 17 generates transmission audio signals according to the output audio signals. Furthermore, the transmitting device 10 has a high definition multimedia interface (HDMI) encoding unit 18. The HDMI encoding unit 18 is used to encode the transmission video signals, the transmission audio signals, and command signals sent from the transmitting control unit 16 and pass the encoded signals to the receiving device 20 for showing videos or outputting audios. Since the transmitting video processing unit 12, the transmitting switch unit 14, the processor 15, the transmitting control unit 16, the transmitting audio processing unit 17, and the HDMI encoding unit 18 are respectively well known in the art, they are not described in details.

Figure 2:
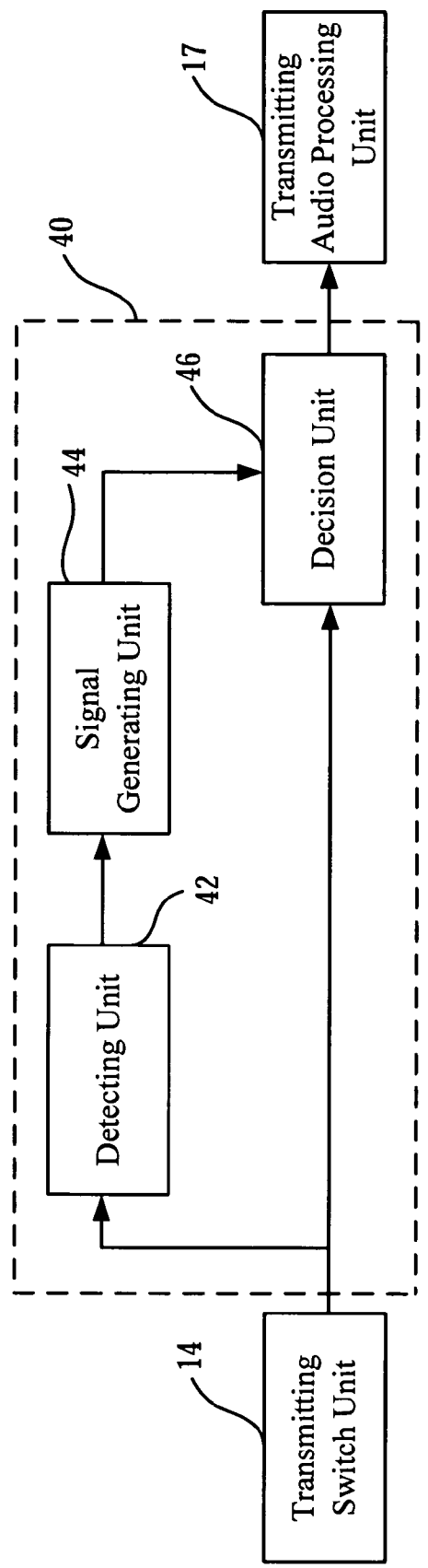
FIG. 2 is a block diagram of a preferred embodiment of the noise processing device in accordance with the present invention.

Reference is made to FIG. 2, which is a block diagram of a preferred embodiment of the noise processing device in accordance with the present invention. As shown in FIG. 2, the noise processing device 40 of the present invention includes a detecting unit 42, a signal generating unit 44 and a decision unit 46. The detecting unit 42 detects the audio signals sent from the transmitting switch unit 14 shown in FIG. 1 and then sends detecting signals to the signal generating unit 44 according to the detecting results. The signal generating unit 44 generates an adjustment signal according to the detecting signals and sends the adjustment signal to the decision unit 46. The decision unit 46 generates the output audio signals according to the adjustment signal and the audio signals sent from the transmitting switch unit 14 and passes the output audio signals to the transmitting audio processing unit 17. The transmitting audio processing unit 17 processes the output audio signals for the receiving device 20 to output the corresponding audios.

The detecting unit 42 described above detects whether there is a discontinuous waveform in the audio signals sent from the transmitting switch unit 14. If positive, the detecting unit 42 issues the detecting signal to the signal generating unit 44 and then the signal generating unit 44 provides a corresponding adjustment signal for the decision unit 46. After receiving the adjustment signal, the decision unit 46 processes the audio signals sent from the transmitting switch unit 14 according to the adjustment signal. The decision unit 46 smoothens the waveform of the audio signals to produce the output audio signals according to the adjustment signal. Hence, the output audio signals are smooth and continuous. Thus, the noise caused by the discontinuous waveform of the audio signals is reduced.

In accordance with the description above, the discontinuous waveform in the audio signals transmitted from the transmitting switch unit 14 is caused in a great variety of circumstances. For example, the system is turned on or off, a mute mode is entered or left, or the video/audio data of the video/audio source 30 is accessed and the corresponding audio signals is transmitted by the transmitting device 10 after a period of pause. The switch state of the transmitting switch unit 14 is changed in these circumstances and hence the discontinuous waveform might be generated in the audio signals transmitted by the transmitting switch unit 14. Hence, noise is caused when the audio signals is played back.

The detecting unit 42 mentioned above can detect the waveform variation of the audio signals within a predetermined time interval. Thereby, the detecting unit 42 can determine whether there is a discontinuous waveform in the audio signals. Since there are a lot of methods for detecting the discontinuous waveform in the prior art, the detecting method of the present invention can be one of them and thus is not described in details.

Furthermore, when the detecting unit 42 finds that the audio signals transmitted from the transmitting switch unit 14 have a discontinuous waveform, the signal generating unit 44 generates a corresponding adjustment signal, which can be a linear signal or a nonlinear signal. The adjustment signal is passed to the decision unit 46. The decision unit 46 smoothens the audio signals according to the adjustment signal and thereby generates output audio signals. If the adjustment signal is a linear signal, it means the gain of the received signals increases linearly in a predetermined time interval. If the adjustment signal is a nonlinear signal, the nonlinear signal can be any combinations of signals that can be expressed as trigonometric functions or signals that are generated according to a window function, such as a Hanning window function. As for the decision unit 46, one of its embodiments is a multiplier.

In another embodiment of the present invention, the detecting unit 42 monitors the status of the transmitting switch unit 14 and thereby generates the detecting signals to the signal generating unit 44.

In another embodiment, the detecting unit 42 couples to the transmitting control unit 16 and detects the signal to correspondingly generate the detecting signals.

Figure 3A:
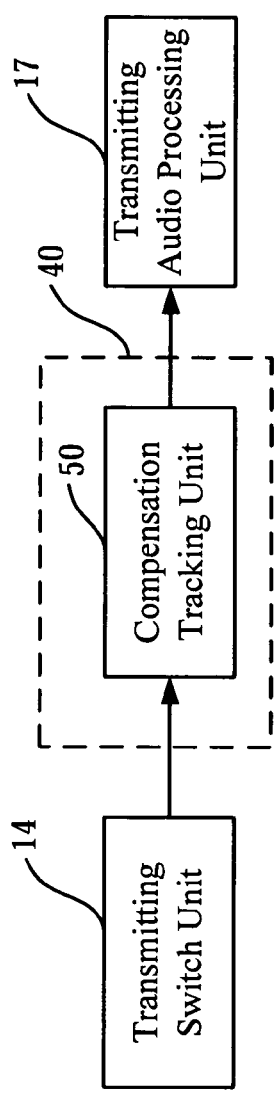
FIG. 3A is a block diagram of another embodiment of the noise processing device in accordance with the present invention.

Reference is made to FIG. 3A, which is a block diagram of another embodiment of the noise processing device in accordance with the present invention. As shown in FIG. 3A, the noise processing device 40 includes a compensation tracking unit 50, which can be realized by using a proportional control unit, an integral control unit, and a differential control unit or by using any combinations of them. The compensation tracking unit 50 generates the output audio signals according to the difference between the audio signals sent from the transmitting switch unit 14 and the previous output audio signals produced by itself. The output audio signals are passed to the transmitting audio processing unit 17. The transmitting audio processing unit 17 processes the output audio signals and provides the processed output audio signals for the receiving device 20 to play back the audios conveyed by these signals. The proportional control unit, the integral control unit, and the differential control unit can be implemented by using the art and hence are not described in details here.

Figure 3B:
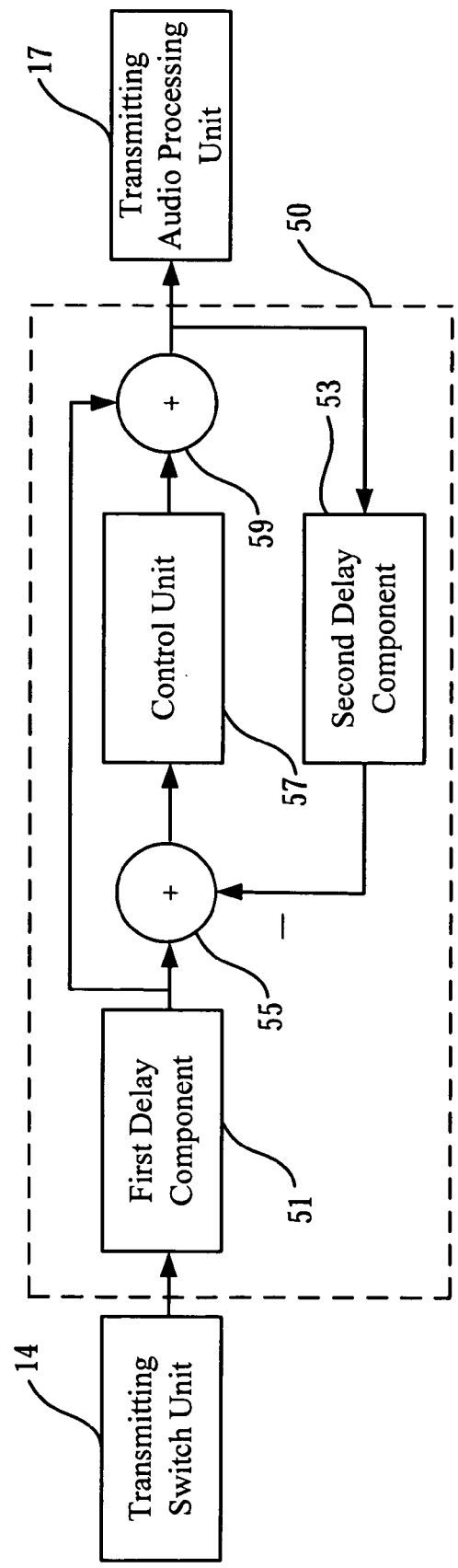
FIG. 3B is a block diagram of an embodiment of the compensation tracking unit in accordance with the present invention.

Reference is made to FIG. 3B, which is a block diagram of an embodiment of the compensation tracking unit in accordance with the present invention. As shown in FIG. 3B, the compensation tracking unit 50 includes a first delay component 51, a second delay component 53, a first summation unit 55, a control unit 57, and a second summation unit 59. The control unit 57 can be a proportional control unit, an integral control unit, a differential control unit, or a combination of them. The first delay component 51 receives and delays the audio signals sent from the transmitting switch unit 14 to generate first delayed audio signals. The second delay component 53 receives and delays the output audio signals produced by the compensation tracking unit 50 to generate second delayed audio signals. The first summation unit 55 subtracts the second delayed audio signals from the first delayed audio signals to produce error signals. The control unit 57 produces compensation signals according to the error signals and its own gain. The second summation unit 59 produces the output audio signals according to the first delayed audio signals and the compensation signals. Please Note that a person of ordinary skill in the art may appreciate the first delay component 51 can be removed without affecting the operation of the compensation tracking unit 50.

Figure 4:
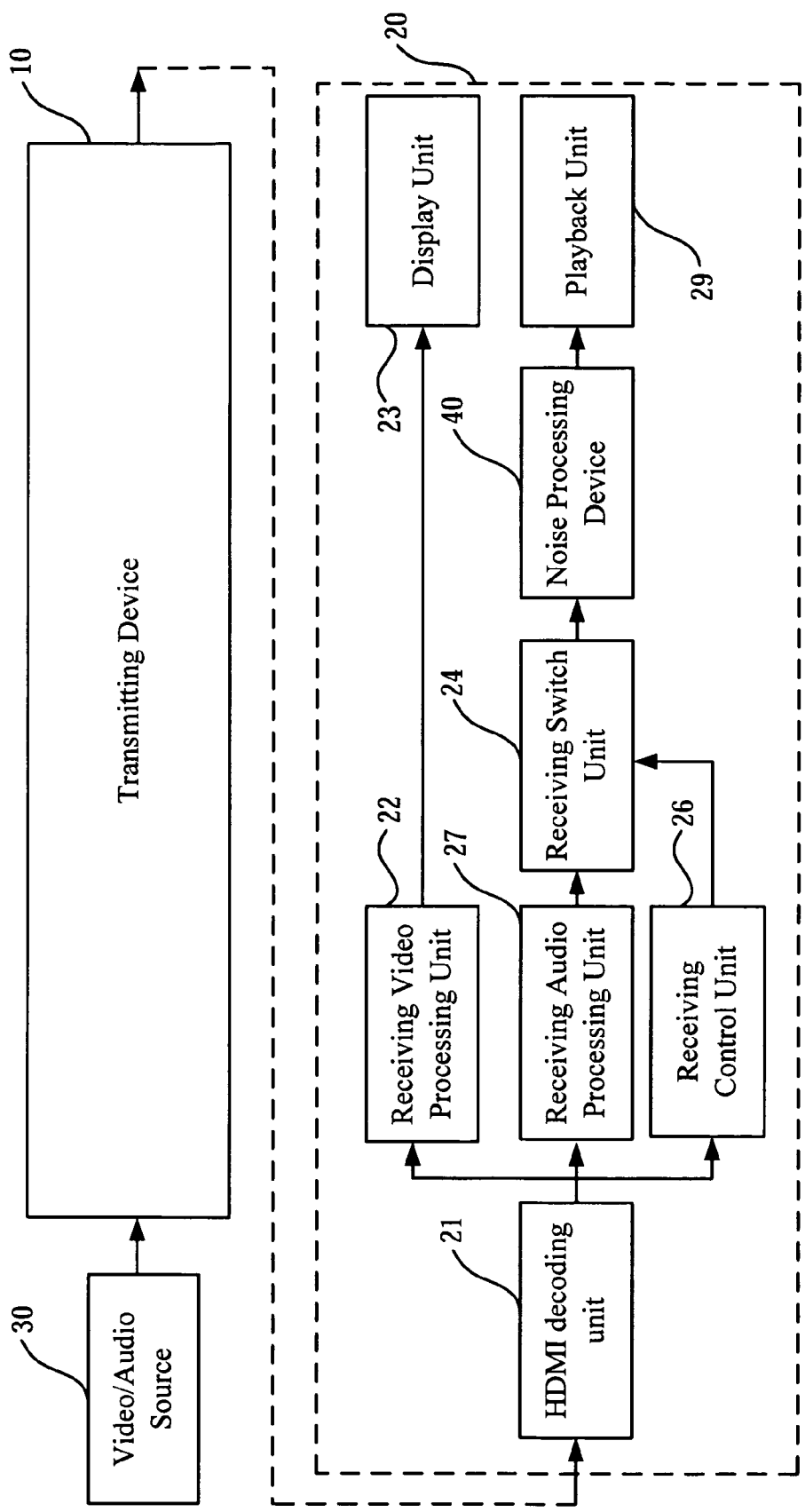
FIG. 4 is a block diagram of a digital video/audio system having a noise processing device in accordance with another preferred embodiment of the present invention.

Except for the transmission device 10, the noise processing device 40 can also be installed in the receiving device 20. Reference is made to FIG. 4, which is a block diagram of a digital video/audio system having a noise processing device in accordance with another preferred embodiment of the present invention. As shown in FIG. 4, the receiving device 20 of the digital video/audio system has a HDMI decoding unit 21, a receiving video processing unit 22, a display unit 23, a receiving switch unit 24, a receiving control unit 26, a receiving audio processing unit 27, a playback unit 29, and a noise processing unit 40. The HDMI decoding unit 21 mentioned above receives and decodes the data transmitted from the transmitting device 10. After being decoded, the video data, the audio data and the control data are passed to and processed by the receiving video processing unit 22, the receiving audio processing unit 27, and the receiving control unit 26, respectively.

The receiving video processing unit 22 produces video signals according to the video data provided by the HDMI decoding unit 21 and passes the video signals to the display unit 23 to show the corresponding videos. The receiving audio processing unit 27 produces audio signals according to the audio data provided by the HDMI decoding unit 21 and passes the audio signals to the receiving switch unit 24. The receiving control unit 26 sends a switch signal to the receiving switch unit 24 according to the control data provided by the HDMI decoding unit 21, a command received by the video/audio system, or an operative state of the video/audio system. The receiving switch unit 24 determines whether the audio signals produced by the receiving audio processing unit 27 should be passed to the noise processing unit 40 according to the switch signal. The noise processing unit 40 processed the audio signals provided by the receiving switch unit 24 to produce output audio signals. The output audio signals are then passed to the playback unit 29 for outputting the corresponding audios.

The HDMI decoding unit 21, the receiving video processing unit 22, the display unit 23, the receiving switch unit 24, the receiving control unit 26, the receiving audio processing unit 27, and the playback unit 29 are respectively well known in the art and are not described in details here. Furthermore, the noise processing unit 40 is the same as that described in the previous embodiment and hence not described here, either.

In another embodiment of the present invention according to the FIG. 4, the detecting unit 42 of the noise processing unit 40 monitors the status of the receiving switch unit 24 and thereby generates the detecting signals to the signal generating unit 44.

In another embodiment according to the FIG. 4, the detecting unit 42 couples to the receiving control unit 26 and detects the signal to correspondingly generate the detecting signals.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are embraced within the scope of the invention as defined in the appended claims.

What is claimed is:

1. A noise processing device, used in a video/audio system having a high definition multimedia interface (HDMI), the noise processing device comprising:

a detecting unit for monitoring a variation related to an audio signal and correspondingly producing a detecting signal, wherein the variation is a discontinuous waveform of the audio signal;
   a signal generating unit for producing an adjustment signal according to the detecting signal; and
   a decision unit for producing a continuous waveform output audio signal according to the discontinuous waveform of the audio signal and the adjustment signal;
   wherein the adjustment signal operates to reduce the effect caused by the variation related to the audio signal.

2. The noise processing device as claimed in claim 1, wherein the adjustment signal is one of a linear signal and a nonlinear signal.

3. The noise processing device as claimed in claim 1, wherein the decision unit mixes the audio signal with the adjustment signal and thereby produces the output audio signal.

4. The noise processing device as claimed in claim 1, wherein the detecting unit monitors the variation according to a signal relevant to the audio signal.

5. The noise processing device as claimed in claim 1, wherein the video/audio system has a transmitting device equipped with an HDMI encoding unit and a receiving device, the noise processing device is installed in at least one of the transmitting device and the receiving device.

6. The noise processing device as claimed in claim 1, wherein the decision unit smoothens a waveform of the audio signal to produce the output audio signal according to the adjustment signal.

7. A noise processing method, used in a video/audio system having a high definition multimedia interface (HDMI), the noise processing method comprising:

monitoring a variation related to an audio signal and thereby producing a detecting signal, wherein the variation is a discontinuous waveform of the audio signal;
   producing an adjustment signal according to the detecting signal; and
   producing a continuous waveform output audio signal according to the discontinuous waveform of the audio signal and the adjustment signal;
   wherein the adjustment signal is for reducing the effect caused by the variation related to the audio signal.

8. The noise processing method as claimed in claim 7, wherein the adjustment signal is a linear signal or a nonlinear signal.

9. The noise processing method as claimed in claim 7, wherein the step of producing the output audio signal according to the audio signal and the adjustment signal comprises:
   multiplying the audio signal with the adjustment signal to produce the output audio signal.

10. The noise processing method as claimed in claim 7, wherein the step of monitoring the variation comprises:
    monitoring the variation according to a signal relevant to the audio signal.

11. The noise processing method as claimed in claim 7, wherein the video/audio system has a transmitting device equipped with an HDMI encoding unit and a receiving device, and the noise processing method is applied for at least one of the transmitting device and the receiving device.

12. The noise processing method as claimed in claim 7, wherein the step of producing the output audio signal according to the audio signal and the adjustment signal comprises:
    smoothening a waveform of the audio signal according to the adjustment signal to produce the output audio signal.

* * * * *